United States Patent
Artal Soriano et al.

(10) Patent No.: US 8,662,664 B2
(45) Date of Patent: Mar. 4, 2014

(54) DEVICE FOR ASYMMETRICAL REFRACTIVE OPTICAL CORRECTION IN THE PERIPHERAL RETINA FOR CONTROLLING THE PROGRESSION OF MYOPIA

(75) Inventors: Pablo Artal Soriano, Murcia (ES); Linda K. Lundstrom, Murcia (ES)

(73) Assignee: Universidad de Murcia, Murcia (ES)

( * ) Notice: Subject to any disclaimer, the term of this patent is extended or adjusted under 35 U.S.C. 154(b) by 79 days.

(21) Appl. No.: 13/256,013

(22) PCT Filed: Mar. 12, 2010

(86) PCT No.: PCT/ES2010/070148
§ 371 (c)(1), (2), (4) Date: Nov. 28, 2011

(87) PCT Pub. No.: WO2010/103160
PCT Pub. Date: Sep. 16, 2010

(65) Prior Publication Data
US 2012/0140165 A1 Jun. 7, 2012

(30) Foreign Application Priority Data
Mar. 12, 2009 (ES) .................................. 200900692

(51) Int. Cl.
*G02C 7/06* (2006.01)
(52) U.S. Cl.
USPC ............. 351/159.41; 351/159.06; 351/159.42
(58) Field of Classification Search
CPC ......... G02C 7/041; G02C 7/045; G02C 7/066
USPC ................. 351/159.06, 159.1, 159.14, 159.4, 351/159.42
See application file for complete search history.

(56) References Cited

U.S. PATENT DOCUMENTS

| 2005/0213027 A1* | 9/2005 | Blum et al. ................... 351/159 |
| 2009/0257026 A1* | 10/2009 | Varnas et al. ................ 351/209 |

* cited by examiner

*Primary Examiner* — Darryl J Collins
(74) *Attorney, Agent, or Firm* — Ladas & Parry LLP

(57) ABSTRACT

Optical device (1) for modifying the optics of the eye in its peripheral retina as prophylaxis of the progression of myopia, that it consists in a lens in which its inferior nasal quadrant (2) modifies the strength in a progressive and controlled manner from the center to the outer zone of the lens. The rest of the quadrants (3) of device (1) have a configuration of a graduated crystal or flat crystal, depending, respectively, on whether the user has some visual defect that requires optical correction or lacks said defect. The lens can be either an optical lens, a contact lens or electro-optical systems.

9 Claims, 6 Drawing Sheets

DEVICE FOR ASYMMETRICAL REFRACTIVE OPTICAL CORRECTION IN THE PERIPHERAL RETINA FOR CONTROLLING THE PROGRESSION OF MYOPIA

FIELD OF THE INVENTION

The present invention refers to a device for controlling the progression of myopia in children and/or adolescents and, more specifically, to an optical device for correcting the refraction in the peripheral retina that is designed in an asymmetric manner. Its application is in the field of optics and, more specifically, in the prophylaxis and prevention of myopia among the infantile population. The application of this device could provoke a delay or including the non-apparition of myopia in children without implying any potential problems.

THE PROBLEM TO BE RESOLVED AND THE STATE OF THE ART

The presence of myopia means that the eye is too elongated in relation to its focal distance, in such a way that the image of an object that is far from the optical elements of the eye (basically the cornea and the lens) is focused in front of the retina (clear), in such a way that the projection on the retina will be fuzzy, which causes deficient vision. Myopia is a very common refractive problem in the population, also commonly associated with astigmatism. Although the optical defect can be corrected with eyeglasses, contact lenses or surgical procedures for refractive surgery, the quality of life of individuals with myopia can be significantly impaired.

A genetic component has been associated with the development of myopia, although there are studies which show that cases of myopia have increased in developed countries in recent generations (see for example, the reference of Morgan, I. & Rose, K. (2005). How genetic is school myopia? *Progress in Retinal and Eye Research* 24, 1-38). For this reason it is now accepted that there is also an environmental component that foments the development of myopia.

The optical properties of myopic eyes in comparison with emmetropic eyes (in which the images of distant objects focus correctly on the retina) display certain differences, in particular in regard to the shape of the retina outside the zone in which the best visual resolution is obtained (known as the fovea). This part is known as the peripheral retina and it plays a very important role in vision, although not for seeing details but for detecting motion or objects in the field of vision. The interaction between the shape of the peripheral retina and the degree of existing myopia is an important aspect. In the state of the art there are known documents which disclose devices for the optical correction of myopia by making use of eyeglasses that modify the optics of the eye in the peripheral retina to try to halt the progression of myopia. Among said documents are U.S. Pat. Nos. 7,025,460, 6,343,861, U.S. patent applications US 2007/296916, US 2007/159601 and PCT applications WO 2007/041796, WO 2008/014544 and WO2008/031166. However, the devices disclosed in these documents (and others) have practical visual discomforts for their users, such as blurry or tunnel vision, which make them uncomfortable and of little use as elements for preventing the increase of myopia.

The invention being proposed here intends to resolve these problems found in the known state of the art by providing a practical and useful instrument for the prophylaxis and prevention of myopia among infantile and/or adolescent populations.

EXPLANATION OF THE INVENTION

The invention describes an optical device for modifying the optics of the eye in its peripheral retina, as prophylaxis of the progression of myopia. The invention consists in a lens that modifies the strength in the inferior nasal quadrant of the lens in a progressive and controlled manner. The change in the strength oscillates between a value of zero in the center of the lens up to a defined power of between 1 and 2 diopters in the outer zone of the lens.

The remaining quadrants of the device have a configured with a crystal graduated in a constant manner or a configuration with a flat crystal, depending, respectively, on whether the user has some visual defect that requires optical correction or lacks said defect.

The lens of the optical device can be, preferably, an optical lens or a contact lens, but also the production of the required changes in strength can also be carried out by means of electro-optical devices, such as spatial light modulators or deformable mirrors.

DESCRIPTION OF A PREFERRED EMBODIMENT OF THE PRESENT INVENTION

The invention deals with a device that modifies the optics of the eye in its peripheral retina so as to halt the progression of myopia. In their research the inventors have demonstrated experimentally that to prevent the increase of myopia it is not necessary to work with the overall periphery of the whole retina, but rather it is sufficient to do so with a part of the same, and more specifically, with the inferior nasal part of the visual field. This conclusion is reached from the results obtained from peripheral refraction in in eyes that are already fully myopic in comparison with emmetropic eyes. In contrast to the earlier assumption, the inventors discovered that the peripheral retina of myopics and emmetropics only display clear differences in some very defined zones, in particular the upper temporal quadrant (which corresponds to the inferior nasal visual field).

Figure 1A:
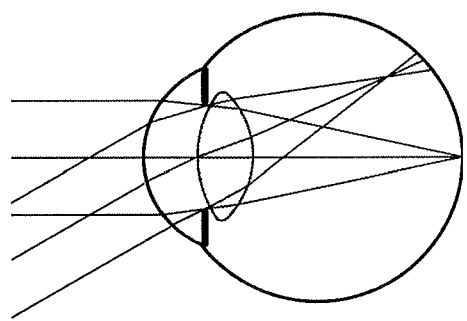
FIG. 1A represents an emmetropic eye, but with a fovea that has myopic behavior in the peripheral zone of the retina, thus generating the image in front of said peripheral zone. The eye represented in FIG. 1B depicts an emmetropic eye with a fovea that has hypermetropic behavior in the peripheral zone of the retina, thus generating the image behind said peripheral zone.
Figure 1B:
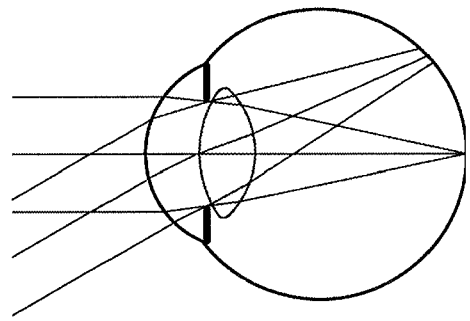
Figure 2A:
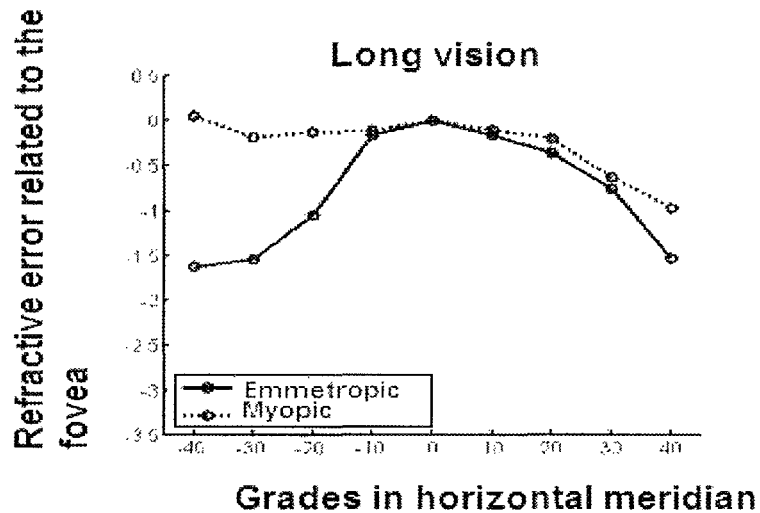
FIGS. 2A, 2B, 2C, and 2D show the results of a study conducted on a group of myopic subjects. The figures show ordinates of the refractive error (in diopters) relative to the fovea and abscissas of the median horizontal angles (FIGS. 2A and 2C) and vertical angles (FIGS. 2B and 2D). The trials were conducted for both farsightedness (FIGS. 2A and 2B) and for nearsightedness (FIGS. 2C and 2D).
Figure 2B:
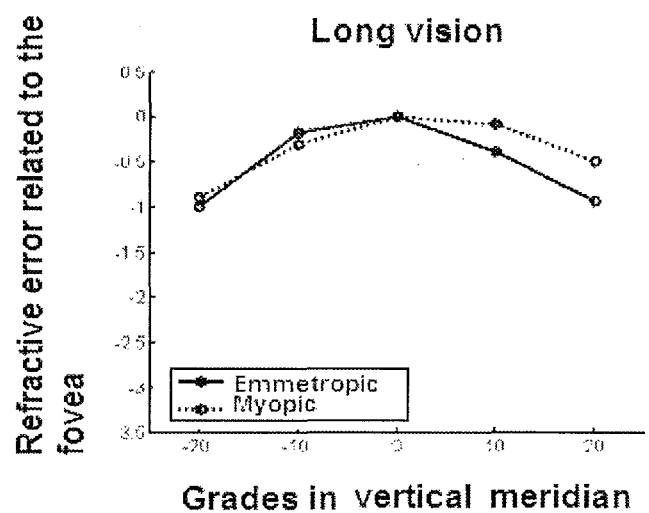
Figure 2C:
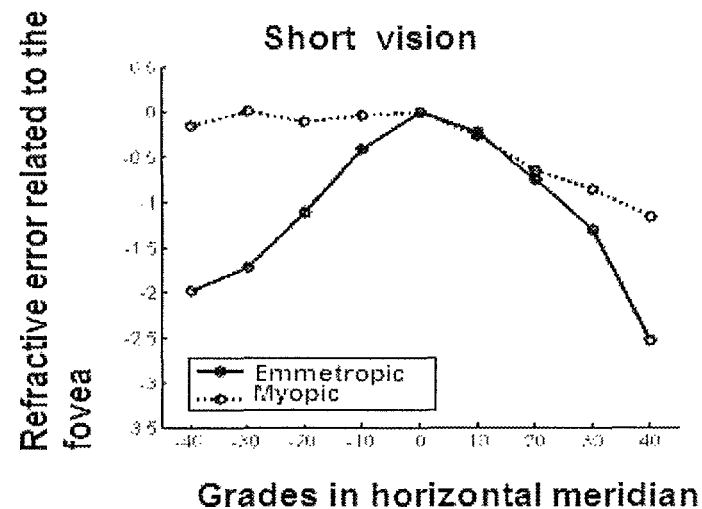
Figure 2D:
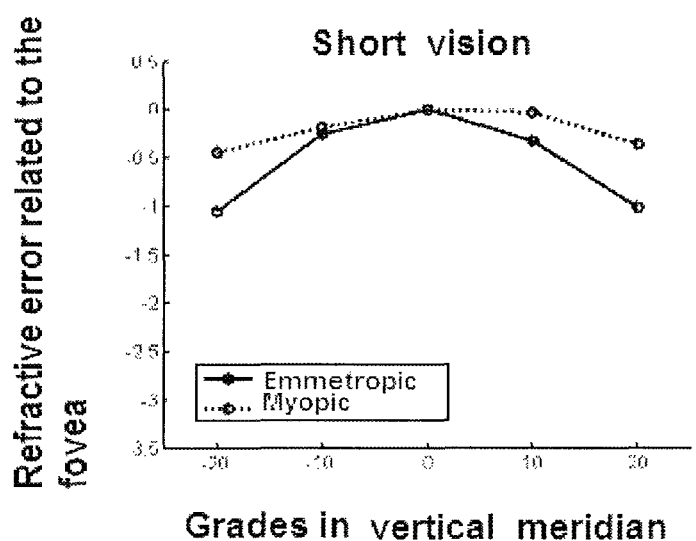

Although habitually there is no awareness of the refractive optical errors in the field of peripheral vision, nowadays it is given consideration as affecting growth of the eye and the development of myopia (see Wallman, J. & Winawer, J., 2004, Homeostasis of eye growth and the question of myopia, *Neuron* 43, 447-468; and Smith III, E. L., Kee, C.-S., Ramamirtham, R., Qiao-Gider, Y., & Hung, L. F., 2005, Peripheral vision can influence eye growth and refractive development in infant monkeys. *Investigative Ophthalmology & Vision Science* 48, 3914-3922). It has been demonstrated that there is a greater risk of the eye becoming myopic when there are refractive errors that place the clear image behind the peripheral retina. It has also been shown that myopic eyes display relatively a lessor myopic peripheral blur compared to emmetropic or hypermetropic eyes, as can be seen in FIGS. 1A and 1B. Both figures represent emmetropic eyes at the fovea. However, the eye depicted in FIG. 1A has myopic behavior in the peripheral zone of the retina, generating the image in front of said peripheral zone. On its part, the eye depicted in FIG. 1B shows hypermetropic behavior in the peripheral zone of the retina, thus generating the image behind said peripheral zone.

The inventors have conducted studies on the refractive peripheral errors in emmetropic and myopic eyes. One of said studies measured the curvature of the field of the eye in a range of +/−40° horizontally and +/−20° vertically, with increments of 10° using a Hartmann-Shack type wave front sensor specially designed to measure peripheral optical aberrations with an open field of vision. Two different accommodation levels were used (with focus objects placed at 0.5 D and 4.0 D, respectively) so as to evaluate the peripheral image quality in both near and far vision. The average results of said studies of a group of eyes are shown in FIGS. 2A, 2B, 2C, and 2D. To obtain the data an experimental device was used for measuring the refractive error in the peripheral retina of the subjects, both in conditions of far vision and near vision. These results are important for showing the differences in the shape of the retina (its refraction) between myopic and hypermetropic eyes.

As can be seen in FIGS. 2A, 2B, 2C and 2D, there are certain zones of the retina in which emmetropic and myopic eyes differ more (the emmetropic eyes being relatively more myopic in the periphery than myopic eyes), especially in the temporal retina, but also in the upper part. Therefore, these zones of the retina appear to be possible candidates for a peripheral correction. They correspond to the zones of the nasal and inferior fields of vision. The idea underlying this invention is the possibility that, by using information from the peripheral retina, a myopic eye with relatively more hypermetropic refraction in the peripheral may continue growing so as to maintain its emmetropic periphery, while in this manner increasing the myopia axial more.

Figure 3:
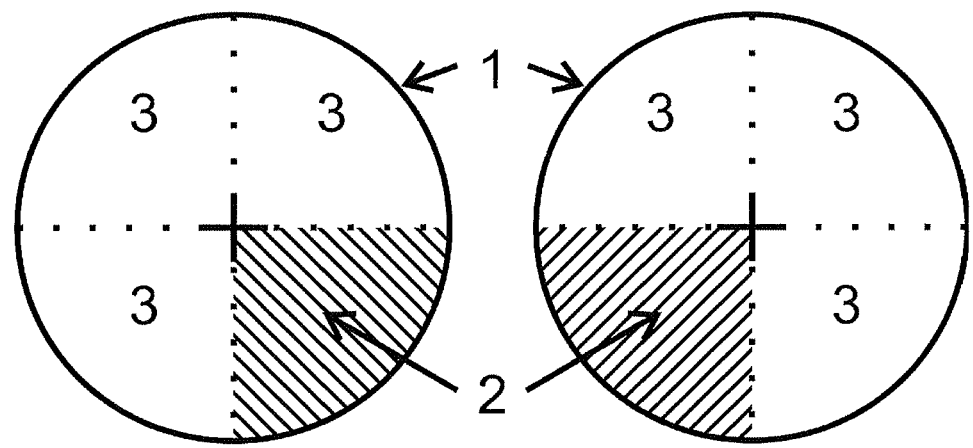
FIG. 3 displays an optical device for optical correction in accordance with the present invention.

The present invention is based on the fact that optical correction manipulates the quality of the image in the region of the retina in which greater differences have been found between an emmetropic eye and a myopic eye, that is, the upper and temporal part of the retina. Specifically, the correcting devices are centered on employing the peripheral zone of the retina corresponding to the inferior nasal part of the field of vision (FIG. 3)

The correction will have a positive, or less negative, effect boosting the image towards the periphery. In other words, the images will be formed in front of the peripheral retina making the eye more myopic in these peripheral zones. To do this an optical device (1) is employed, comprising, as can be seen, mainly a lens, or possibly a contact lens, that in its inferior nasal quadrant (2) modifies the strength of the lens in a progressive manner. The rest of the quadrants (3) of device (1) display a configuration of either graduated crystal or flat crystal, depending on whether the user has, respectively, some visual defect that may require optical correction or lacks said defect. It is possible incorporate into the rest of the zones of the lens either a fixed correction or diverse variations of the appropriately chosen strengths.

Figure 4A:
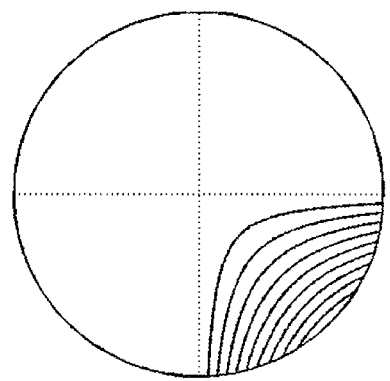
FIGS. 4A, 4B, and 4C represent some examples in profile which can be included in the device of FIG. 3, in accordance with how the strength of the lens is modified in a progressive manner so as to produce the desired refraction in the peripheral retina.
Figure 4B:
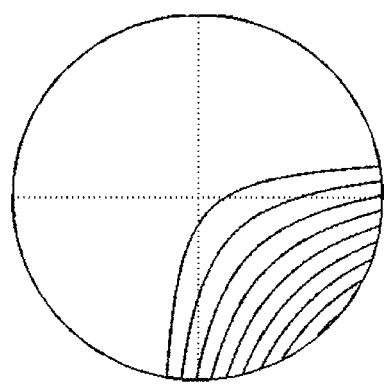
Figure 4C:
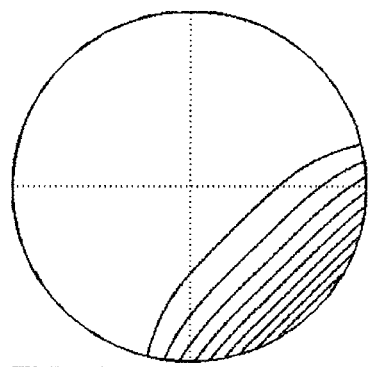

Some examples of the profile are shown in FIGS. 4A, 4B and 4C, although it must be pointed out that this arrangement does not exclude other arrangements for compensating the temporal retina. The central portion of the correction must be left for the correction of the refractive errors of the fovea and, if necessary, a peripheral part of the correction can also be given an additional correction so as to improve near vision.

FIGS. 4A, 4B, and 4C also show the respective curves of the constant dioptric levels in each case in accordance with the changes being made to the strength. As can be seen in said Figures, the weakening of the strength can be produced both on the sides and in the center of the lens, as is illustrated in the different configurations represented.

Experimental studies carried out by the inventors show that the best results are obtained when the changes in strength oscillate between a value of zero in the center of the lens up to a defined value between 1 and 2 diopters in the outer zone of the lens. This corresponds to the additional blurring values of up to 2 diopters and 40 degrees of eccentricity.

Figure 5A:
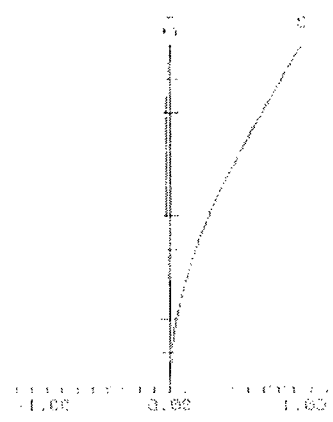
FIGS. 5A, 5B and 5C show the curvature in the field of an eye without any correction (FIG. 5A), and with the correction proposed by the present invention (FIGS. 5B and 5C).
Figure 5B:
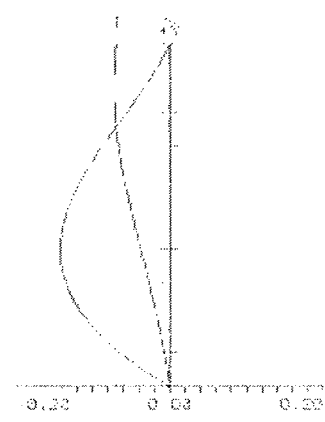
Figure 5C:
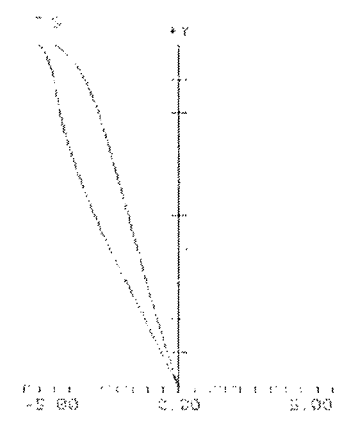

FIG. 5A shows the curvature of the field of an eye without any correction. With the correction proposed in the present invention the curvature of the field relative to the eye will be left unaltered in the upper temporal visual field and only the nasal field will have a relatively stronger myopic blurring, as shown in FIGS. 5B and 5C.

The main advantage of the configuration proposed by this invention with respect to the known state of the art is that the manipulation of the peripheral image is done in the part of the retina that is most susceptible to this action. Consequently, vis-a-vis the progression of myopia it can have the same effect as the initial radial designs, resulting in a minimal discomfort for the user.

It should be noted that other inventions based on similar principles of controlling the progression of myopia use corrections on the whole peripheral vision, which leads to a series of visual problems for the users, such as distortions, blurry vision, movements, etc. These types of problems have made it practically impossible to use these inventions, depriving users of a possible therapeutic tool.

The invention claimed is:

1. Optical device for modifying the optics of the eye in its peripheral retina as prophylaxis of the progression of myopia, which optical device consists in a lens in which its inferior nasal quadrant but only the inferior nasal quadrant modifies the strength in a progressive and controlled manner outwardly from the center of the lens.

2. Optical device for modifying the optics of the eye in its peripheral retina as prophylaxis of the progression of myopia in accordance with content of claim 1, characterized in that the change of strength oscillates between a value of zero in the center of the lens up to a defined value in the outer zone of the lens of between 1 and 2 diopters.

3. Optical device for modifying the optics of the eye in its peripheral retina as prophylaxis of the progression of myopia in accordance with content of claim 1, wherein the rest of the quadrants of device have a configuration of a crystal graduated in a constant manner.

4. Optical device for modifying the optics of the eye in its peripheral retina as prophylaxis of the progression of myopia in accordance with content of claim 1, wherein the rest of the quadrants of device have a configuration of a flat crystal.

5. Optical device for modifying the optics of the eye in its peripheral retina as prophylaxis of the progression of myopia in accordance with content of claim 1, the lens is an optical lens.

6. Optical device for modifying the optics of the eye in its peripheral retina as prophylaxis of the progression of myopia in accordance with content of claim 1, wherein the lens is a contact lens.

7. Optical device for modifying the optics of the eye in its peripheral retina as prophylaxis of the progression of myopia in accordance with content of claim 1, wherein the production of the required changes of strength are produced by means of electro-optical type devices.

8. Optical device for modifying the optics of the eye in its peripheral retina as prophylaxis of the progression of myopia in accordance with content of claim 7, wherein the electro-optical devices are spatial light modulators.

9. Optical device for modifying the optics of the eye in its peripheral retina as prophylaxis of the progression of myopia in accordance with content of claim 7, wherein the electro-optical devices are deformable mirrors.

* * * * *